(12) United States Patent
Grover et al.

(10) Patent No.: US 11,582,290 B2
(45) Date of Patent: Feb. 14, 2023

(54) SWITCH EVENT ORDERING

(71) Applicant: HEWLETT PACKARD ENTERPRISE DEVELOPMENT LP, Houston, TX (US)

(72) Inventors: Rajeev Grover, Roseville, CA (US); Duane Mentze, Roseville, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 409 days.

(21) Appl. No.: 16/751,077

(22) Filed: Jan. 23, 2020

(65) Prior Publication Data

US 2021/0232444 A1   Jul. 29, 2021

(51) Int. Cl.
*G06F 16/23* (2019.01)
*H04L 67/10* (2022.01)

(52) U.S. Cl.
CPC .......... *H04L 67/10* (2013.01); *G06F 16/2365* (2019.01)

(58) Field of Classification Search
CPC .............. G06F 9/542; G06F 16/24568; G06F 16/2365; H04L 67/10; H04L 41/0816
See application file for complete search history.

(56) References Cited

U.S. PATENT DOCUMENTS

| | | | | |
|---|---|---|---|---|
| 5,444,851 A * | 8/1995 | Woest | ...................... | G06F 9/465 709/228 |
| 6,876,652 B1 * | 4/2005 | Bell | ...................... | H04J 3/0685 370/386 |
| 7,376,719 B1 * | 5/2008 | Shafer | ................. | H04L 41/0873 709/223 |
| 7,949,734 B1 * | 5/2011 | Fong | .................... | H04L 41/0843 709/224 |
| 9,904,721 B1 * | 2/2018 | Holenstein | .......... | G06F 16/2379 |
| 10,380,131 B2 * | 8/2019 | Lee | ........................ | G06F 16/258 |
| 11,210,596 B1 * | 12/2021 | Baker | ....................... | G06N 5/04 |
| 2003/0131027 A1 * | 7/2003 | Holenstein | .......... | G06F 16/2343 |
| 2016/0277318 A1 * | 9/2016 | Guntaka | ............. | H04L 41/0813 |
| 2016/0321341 A1 * | 11/2016 | Ramamurthi | .......... | H04L 45/02 |
| 2017/0155599 A1 * | 6/2017 | Vobbilisetty | ............ | H04L 49/25 |
| 2017/0279659 A1 * | 9/2017 | Duda | ...................... | H04L 67/60 |
| 2019/0332712 A1 * | 10/2019 | Wild | ...................... | G06F 16/221 |
| 2020/0195501 A1 * | 6/2020 | Shenoy | ............... | H04L 41/0863 |
| 2021/0373960 A1 * | 12/2021 | Daniels | .................... | G06F 9/542 |
| 2022/0116303 A1 * | 4/2022 | Sommers | ................ | H04L 43/08 |

* cited by examiner

*Primary Examiner* — Jorge A Casanova
(74) *Attorney, Agent, or Firm* — Hewlett Packard Enterprise Patent Department (57) ABSTRACT

Examples disclosed herein relate to a method comprising detecting a plurality of changes in a database, wherein the database is used to configure a switch operating traffic on a network. The method may include determining that a subset of the plurality of changes are to be deferred before being used to configure the switch, wherein each change in the subset has a potential dependency with at least one other change in the subset. The method may also include iterating through each change in the subset. The iteration may include confirming that a target change has a dependency with another change in the subset, resolving the dependency and transmitting the target change to an object manager for configuration of the switch.

19 Claims, 5 Drawing Sheets

SWITCH EVENT ORDERING

BACKGROUND

A network device, such as a switch, may be configured to operate network traffic in a desired way. Traditionally, a network device, such as a switch, may be configured by a text file or the like. For example, many switches may be configured via Command-Line Interface (CLI).

BRIEF DESCRIPTION OF THE DRAWINGS

The following detailed description references the drawings, wherein.

DETAILED DESCRIPTION

The present disclosure describes aspects of systems and methods for switch event ordering that includes a switch that utilizes a corresponding database to configure and/or operate the switch. The database may store configuration, status, states and statistics of the system. The systems and methods may leverage the database, which may include a specialized time series database, to correlate and analyze a variety of system data, triggering troubleshooting routines when an anomaly is detected and also providing a history of events leading to a root cause. However, because a large number of configuration changes could be made in the database during any given interval, it may be beneficial to manage the order in which the changes made in the database are used to configure the switch.

Aspects of the system and method described herein can properly order changes made to the database through the use of a Sequencer. Sequencer is a stream processing engine (SPE) that takes a stream of network traffic routing programing events with inherent interdependencies, applies speculative and concrete logic to re-sequence the events so that they can be effectively programed into hardware while preserving the interdependencies.

To arrive at a programmable sequence, the sequencer may examine each event and decide whether to submit the event for programing or defer because of possible outstanding dependencies that may be satisfied by other events in the stream. Sequencer may make multiple passes over the events arriving in a stream. The sequencer may start off processing events inline i.e. as they arrive and use speculative logic to arrive at a decision. Once the sequencer has processed each of the events in the stream, it may use concrete logic to make one or more passes analyzing the events until each of the events get submitted for programming.

A method for switch event ordering may include detecting a plurality of changes in a database, wherein the database is used to configure a switch operating traffic on a network. The method may also include determining that a subset of the plurality of changes are to be deferred before being used to configure the switch, wherein each change in the subset has a potential dependency with at least one other change in the subset and iterating through each change in the subset. The iteration may include confirming that a target change has a dependency with another change in the subset, resolving the dependency and transmitting the target change to an object manager for configuration of the switch.

Figure 1:
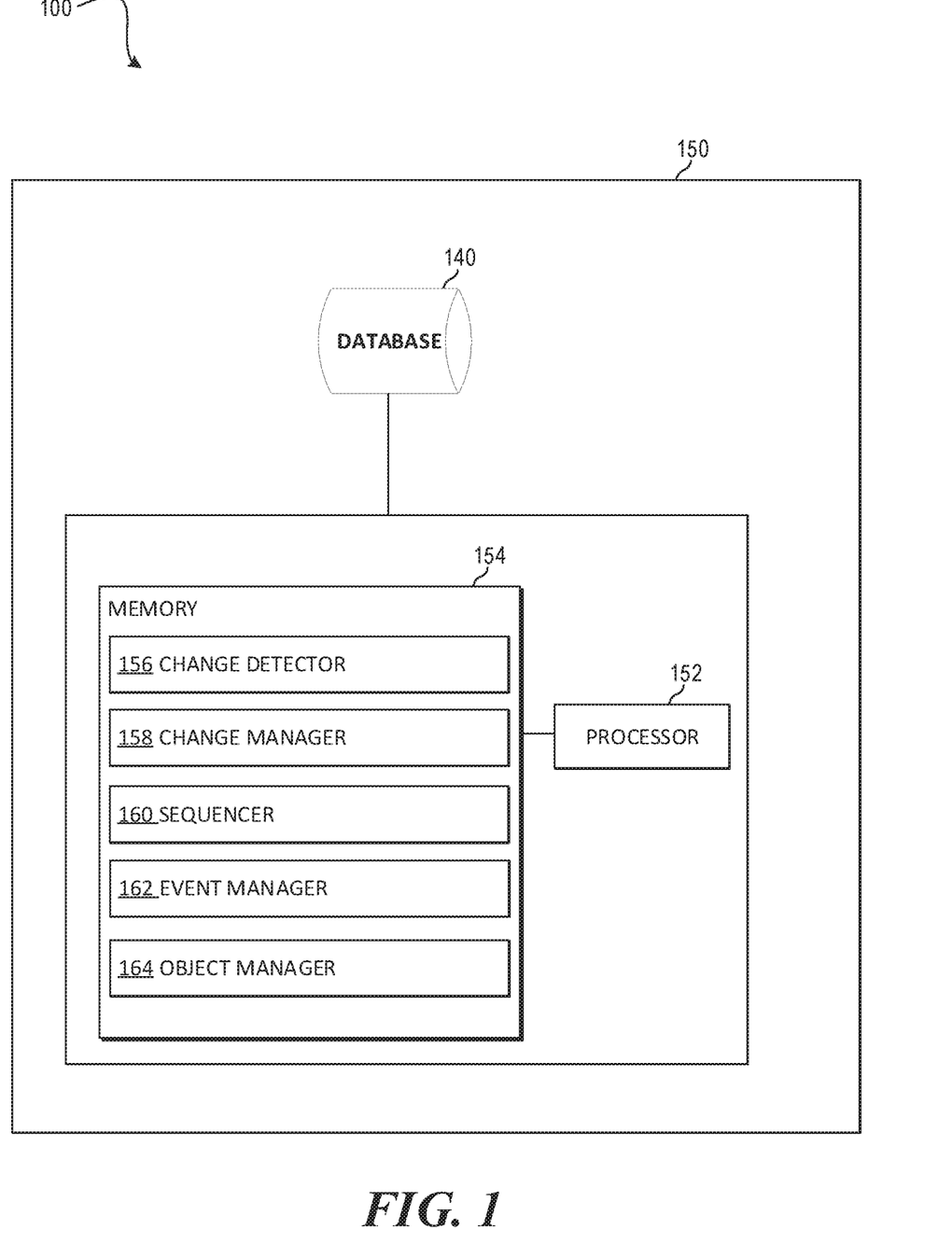
FIG. 1 is a block diagram of an example system where switch event ordering may be useful.

FIG. 1 is a block diagram of an example system 100 where switch configuration troubleshooting may be useful. System 100 may implement a database driven network switch architecture. The system 100 may include a database 140. The database may be internal or external to the switch 150. For example, the database may reside in another switch connected to switch 150, in a separate device, etc. In some aspects, the database may be stored on a device in a physically different location than the switch 150, such as a cloud data center. In aspects where the database 140 is not part of the switch 150, the database 140 and switch 150 may be connected by a link, which may be a physical link, such as an Ethernet connection or other physical connection, a wireless connection, a virtual connection, etc.

A network switch, such as switch 150, may have routing capabilities such that the switch is responsible for routing data along a route (or equivalently, path) in a network. The switch may perform routing of data based on routing information accessible by the switch. For example, the routing information can be stored on a storage medium of the router, or on a storage medium separate from but accessible by the switch.

A database 140, may store some or all of the configuration, status, states and statistics of the network, the switches 150 and/or other devices on the network at any given point at time. The different state data may be accessed from the databases 150 either individually (data for a given time, a given device, etc.) or in aggregate (data aggregated for particular items over a given time period, etc.). In other words, the state of the switch may be retrieved from any arbitrary state to any other arbitrary state by manipulating the database. The switch 150 may respond to these manipulations by reconfiguring itself to and perform any functionality required to achieve that state.

In this manner, the switch 150 has access to numerous data points of information for devices on the network (including the switch 150 itself) and the network itself at different points in time. This also provides the switch 150 with a wide variety of information for monitoring, analysis, troubleshooting, etc.

In addition to discovering and detecting events, anomalies, conditions, etc., errors may be dealt with programmatically. For example, if certain parameters meet certain conditions, certain actions to correct these parameters or other network conditions may be performed and/or a user may be notified to take manual intervention steps. Similarly, the parameters can be monitored over a certain period of time and the parameters can be compared over the period of time and/or compared to historical data. Additionally, a set of repeatable actions can be programmed to occur in certain circumstances based on the monitored parameters and/or other parameters. These automated responses may be programmed via REST, Ansible, as well as other scripting languages that can access data stored in a database.

Switch 150 may include a processor 152 and a memory 154 that may be coupled to each other through a communication link (e.g., a bus). Processor 152 may include a single or multiple Central Processing Units (CPU) or another suitable hardware processor(s). In some examples, memory 154 stores machine readable instructions executed by processor 152 for system 150. Memory 154 may include any suitable combination of volatile and/or non-volatile memory, such as combinations of Random Access Memory (RAM), Read-Only Memory (ROM), flash memory, and/or other suitable memory.

Memory 154 stores instructions to be executed by processor 152 including instructions for change detector 156, event manager 158, sequencer 160, event manager 162, object manager 164 and/or other components. According to various implementations, system 150 may be implemented in hardware and/or a combination of hardware and programming that configures hardware. Furthermore, in FIG. 1 and other Figures described herein, different numbers of components or entities than depicted may be used.

Processor 152 may execute change detector 156 to detect a plurality of changes in a database, wherein the database is used to configure a switch operating traffic on a network. The plurality of changes may occur during a specific temporal period. Accordingly, the change detector 156 may also create a snapshot of the database at the end of the temporal period which is transmitted to the sequencer 160 for use in determining deferrals and potential dependencies.

Processor 152 may execute change manager 158 to convert each change in the plurality of changes into a data structure that can be used to configure the switch. Processor 152 may execute sequencer 160 to perform a first phase of processing through each change in the plurality of changes to determine that a subset of the plurality of changes are to be deferred before being used to configure the switch. Each change in the subset may have a potential dependency with at least one other change in the subset. Each change in the subset of the plurality of changes may be deferred because of an action associated with that change.

The potential dependencies may be based on the snapshot of the database. Sequencer 160 may transfer each change in the subset into a deferred queue. Sequencer 160 may transmit each change in the plurality of changes that is not to be deferred to the event manager to be further transmitted to a corresponding object manager for configuration of the switch. The first pass may be a single pass through and thus the sequencer 160 may determine that a subset of the plurality of changes are to be deferred without knowing each potential dependency in the plurality of changes.

The sequencer 160 may further iterate through each change in the subset via a second phase of processing through each change in the deferred queue. The iteration may include confirming that a target change has a dependency with another change in the subset, resolving the dependency and transmitting the target change to an object manager for configuration of the switch. The second phase of processing may also be based on the snapshot of the database as well as each other change in the deferred queue. Accordingly, the sequencer may iterate through each change in the subset with knowledge of each potential dependency in the plurality of changes. The sequencer 160 may determine if there are any deadlocks in the subset. Any change not resolved during the second phase may be considered a deadlock.

The sequencer 160 may further iterate through the deadlocks during a third phase. The sequencer 160 may resolve the deadlocks after each other change in the subset has been resolved.

Processor 152 may execute event manager 162 to determine, for each resolved change, a corresponding object manager 164. Processor 152 may execute object manager 164 to program the change into hardware.

As described above, the database 140 may be used for the configuration of a network switch 150. Accordingly, a change may be made to the database 140 concerning a network setting such as, for example, a route, a destination, a group, etc. These changes may be made automatically by one or more devices on a network, manually by a system administrator, may be caused by a network event (such as a new device connecting to a switch 150), etc. Specifically, each change to the database 140 may be made in the form of an entry in the database 140. The database 140 may be a time series database 140, an Open vSwitch Database (OVSDB), a relational database, etc. as well as some combination of the above examples. A change detector 156 may monitor the database 140 for any changes. The change detector 156 may also periodically report changes made during certain time intervals. The change detector 156 may then transmit a notification of these changes to a change manager 158. The change detector 156 may also take a snapshot of the database 140 at the end of the time interval and make the snapshot available to other modules in the switch 150.

The change manager 158 may receive the changes from the change detector 156 and process the changes. During the processing, the change manager 158 may take changes that are formatted as database 140 entries and restructure the changes into a data structure that can be used to configure a network switch 150. The change manager 158 may transmit the changes in the updated data structure to the sequencer 160.

The sequencer 160 may receive the changes from the change manager 158 and enter into a first phase of processing the events. The first phase of the processing may be performed inline i.e. as the changes are received, and determine if any changes are to be deferred. Importantly, the first phase of processing may be a single pass phase, meaning that each change is looked at once. This also means that the sequencer 160 is making a decision to defer based on incomplete information, as the sequencer 160 has not seen each change that is received. During the first phase, the sequencer 160 may determine whether to defer a change based on a variety of factors. One factor may include if there are any dependencies in the change. A dependency is a reference in the change to another object that is not the subject of the change.

For example, a change may include a change to delete a group used by the network switch 150. However, there is a potential dependency with that change because the group being deleted may still be used by another object in the configuration of the switch 150, such as being in use by a route. Deleting the group while the route is still using the group may create errors and/or other consequences. Accordingly, the sequencer 160 may decide to defer this change. If there is a change to add/modify to a group, there is a potential dependency that the members of that group may not be ready yet and/or the ID of the member is not available yet. If there is a change to delete a destination, there is a potential dependency that destination may still be in use. If there is a change to add/modify a route, a potential dependency may be that the group or destination is not ready. If there is a change to modify/add a neighbor, a potential dependency maybe that the destination of the neighbor may not be ready. Although a number of examples have been provided, these are for exemplarily purposes only and the above list is not exhausted. A deferral may be made by the sequencer 160 for any number of reasons including certain actions, references, etc.

Each deferred change identified by the sequencer 160 may go to a defer queue. After the first phase is completely, the sequencer 160 may process each change in the deferred queue to resolve any dependencies and/or reorder the changes so that the dependencies are resolved. The second phase may include multiple passthroughs until each change in the deferred queue is resolved or identified as a deadlock. Deadlocks are resolved during a third phase of the sequencer 160. Resolved changes are then sent to the event manager 162.

An example environment may include a route 1 that leads to a group 1, the group 1 consisting of a destination A and a destination B. A change may be desired to modify route 1 to point to a destination C. This change may be performed using a plurality of configuration changes in the database 140 including delete group 1, delete destination A, delete destination B, add destination C and modifying route 1. However, if these changes are performed in the order that they are received, it may lead to a variety of errors, as the destination of route 1 is deleted before the new destination is changed. Accordingly, these five actions may be identified during phase 1 of the sequencer 160 processing as having potential dependencies. During the second phase of the processing, the sequencer 160 may reorder these five steps to avoid any errors. Accordingly, the sequencer 160 may put the changes in the following order—(1) add destination C, (2) modifying route 1, (3) delete group 1, (4) delete destination A, (5) delete destination B.

A deadlock may occur when one or more changes cannot be resolved without creating some sort of network disturbance. However, a deadlock may be able to be mitigated to some extent by the sequencer 160. For example, a first route may have a destination A with ID 1 and a second route may have a destination B with ID 2. A change may be desired to change route 1 to a destination C with ID 2 and change route 2 to a destination D with ID 1. This change may be made in the database 140 with the following commands: Delete destination A, delete destination B, add destination C, add destination D, modify route 1 and modify route 2. During the first phase, the sequencer 160 may flag these changes as potential dependencies. During the second phase, the sequencer 160 may flag these changes as a deadlock because at some point during the resolution of the change, there will be no destination for route 1. However, the sequencer 160 may reorder the changes in order to reduce downtime, errors. Etc. Accordingly, the sequencer 160 may put the changes in the following order—(1) delete route 1, (2) delete route 2, (3) delete destination A, (4) delete destination B, (5) add destination C, (6) add destination D, (7) add route 1 and (8) add route 2.

After each change is resolved, during any of phases 1-3, each change may be sent to the event manager 162. The event manager 162 may process each change and determine what object is involved in the change in order to send the change to the proper object manager 164. Objects may include routes, groups, destinations, etc. Once the change is received by the corresponding object manager 164, the object manager 164 determines whether the change is new or it is an update and pushes the change to the switch 150 hardware.

Figure 2:
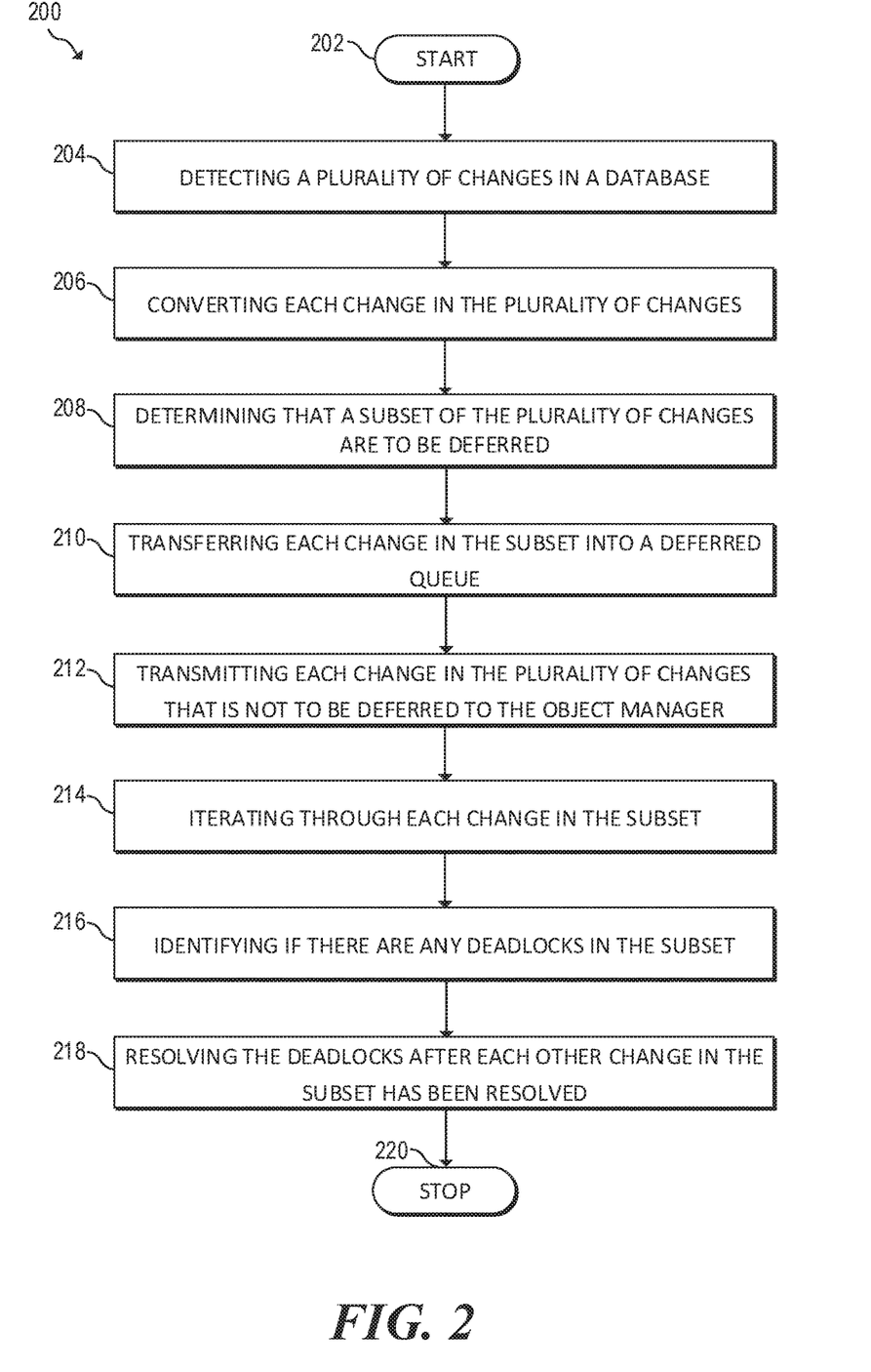
FIG. 2 is a flowchart of an example method for switch event ordering.
Figure 3:
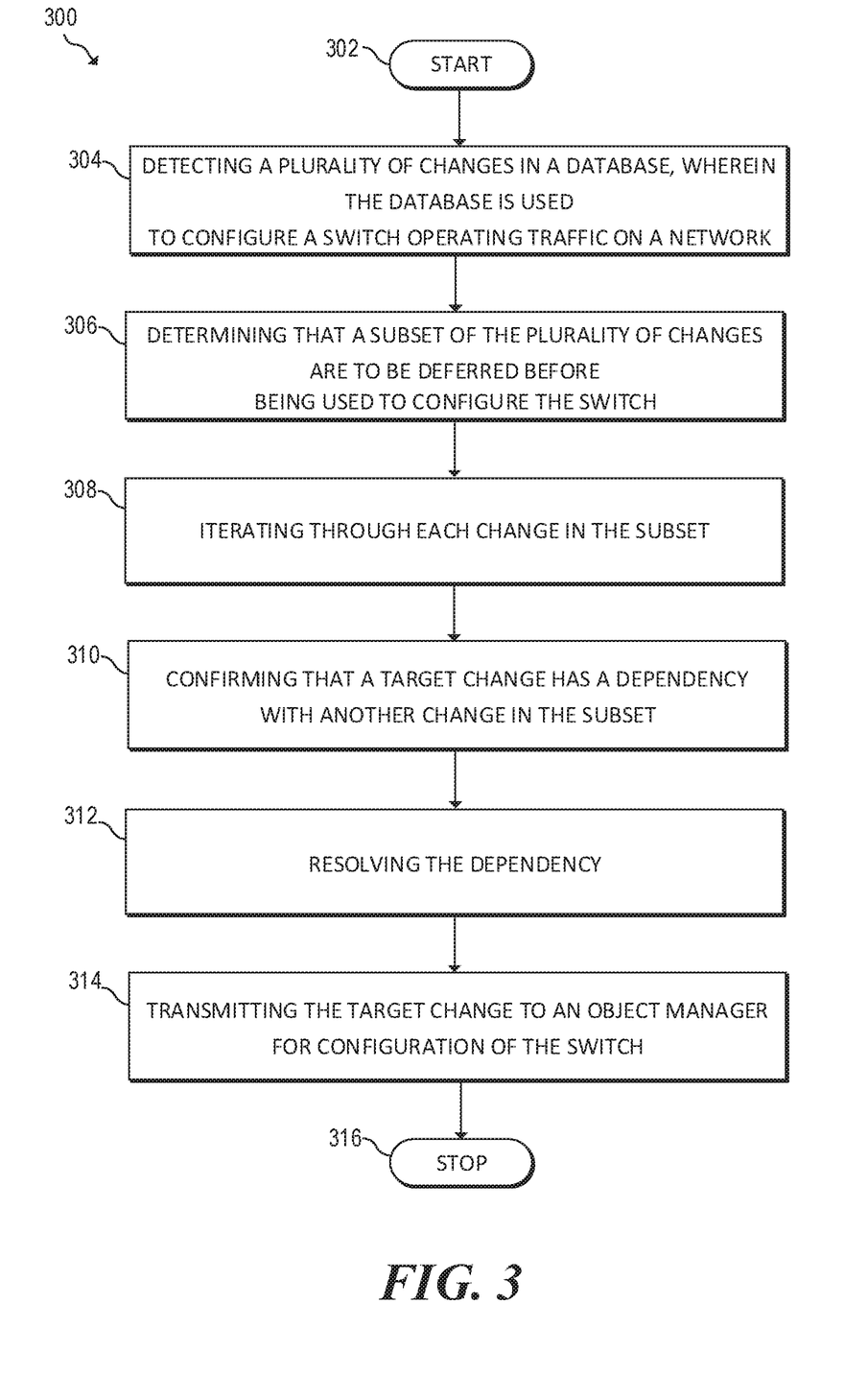
FIG. 3 is a flowchart of another example method for switch event ordering.

Referring now to FIGS. 2-3, flow diagrams are illustrated in accordance with various examples of the present disclosure. The flow diagrams represent processes that may be utilized in conjunction with various systems and devices as discussed with reference to the preceding figures, such as, for example, system 100 described in reference to FIG. 1, system 400 described in reference to FIG. 4 and/or system 500 described in reference to FIG. 5. While illustrated in a particular order, the flow diagrams are not intended to be so limited. Rather, it is expressly contemplated that various processes may occur in different orders and/or simultaneously with other processes than those illustrated. As such, the sequence of operations described in connection with FIGS. 2-3 are examples and are not intended to be limiting. Additional or fewer operations or combinations of operations may be used or may vary without departing from the scope of the disclosed examples. Thus, the present disclosure merely sets forth possible examples of implementations, and many variations and modifications may be made to the described examples.

FIG. 2 is a flowchart of an example method 200 for switch event ordering. For example, method 200 may be used in an environment similar to system 100, described above in reference to FIG. 1. A sample database used in conjunction with the method and system of FIG. 1 may be an Open vSwitch Database (OVSDB). The databases may have a plurality of rows and unique identifiers for the rows.

Method 200 may start at block 202 and continue to block 204, where the method 200 may include detecting a plurality of changes in a database. The database may be used to configure a switch operating traffic on a network. The plurality of changes may occur during a specific temporal period. In some aspects, the method may also include creating a snapshot of the database at the end of the temporal period which is transmitted to the sequencer for use in determining deferrals and potential dependencies The method may proceed to block 206, where the method may include converting each change in the plurality of changes into a data structure that can be used to configure the switch. The method may proceed to block 208, where the method may include determining that a subset of the plurality of changes are to be deferred before being used to configure the switch. Each change in the subset may have a potential dependency with at least one other change in the subset. Each change in the subset of the plurality of changes may be deferred because of an action associated with that change. The potential dependencies may be based on the snapshot of the database. Block 208 may be part of a first phase of processing, may be a single pass through and thus the sequencer 160 may determine that a subset of the plurality of changes are to be deferred without knowing each potential dependency in the plurality of changes.

At block 210, the method may include transferring each change in the subset into a deferred queue and at block 212, the method may include transmitting each change in the plurality of changes that is not to be deferred to the event manager to be further transmitted to a corresponding object manager for configuration of the switch. At block 214, the method may include iterating through each change in the subset via a second phase of processing through each change in the deferred queue. The iteration may include confirming that a target change has a dependency with another change in the subset, resolving the dependency and transmitting the target change to an object manager for configuration of the switch. The second phase of processing may also be based on the snapshot of the database as well as each other change in the deferred queue. Accordingly, the method may include iterating through each change in the subset with knowledge of each potential dependency in the plurality of changes. Any change not resolved during the second phase may be considered a deadlock. At block 216, the method may include determining if there are any deadlocks in the subset and at block 218, the method may include resolving the deadlocks. The method may proceed to block 220, where the method may end.

FIG. 3 is a flowchart of an example method 300 for switch event ordering. For example, method 300 may be used in an environment similar to system 100, described above in reference to FIG. 1. A sample database used in conjunction with the method and system of FIG. 1 may be an Open vSwitch Database (OVSDB). The databases may have a plurality of rows and unique identifiers for the rows.

Method 300 may start at block 302 and continue to block 304, where the method 300 may include detecting a plurality of changes in a database, wherein the database is used to configure a switch operating traffic on a network. At block 306, the method may include determining that a subset of the plurality of changes are to be deferred before being used to configure the switch, wherein each change in the subset has a potential dependency with at least one other change in the subset. At block 308, the method may include iterating through each change in the subset. At block 310, the method may include confirming that a target change has a dependency with another change in the subset and at block 312, the method may include resolving the dependency. At block 314, the method may include transmitting the target change to an object manager for configuration of the switch. The method may proceed to block 316, where the method may end.

Figure 4:
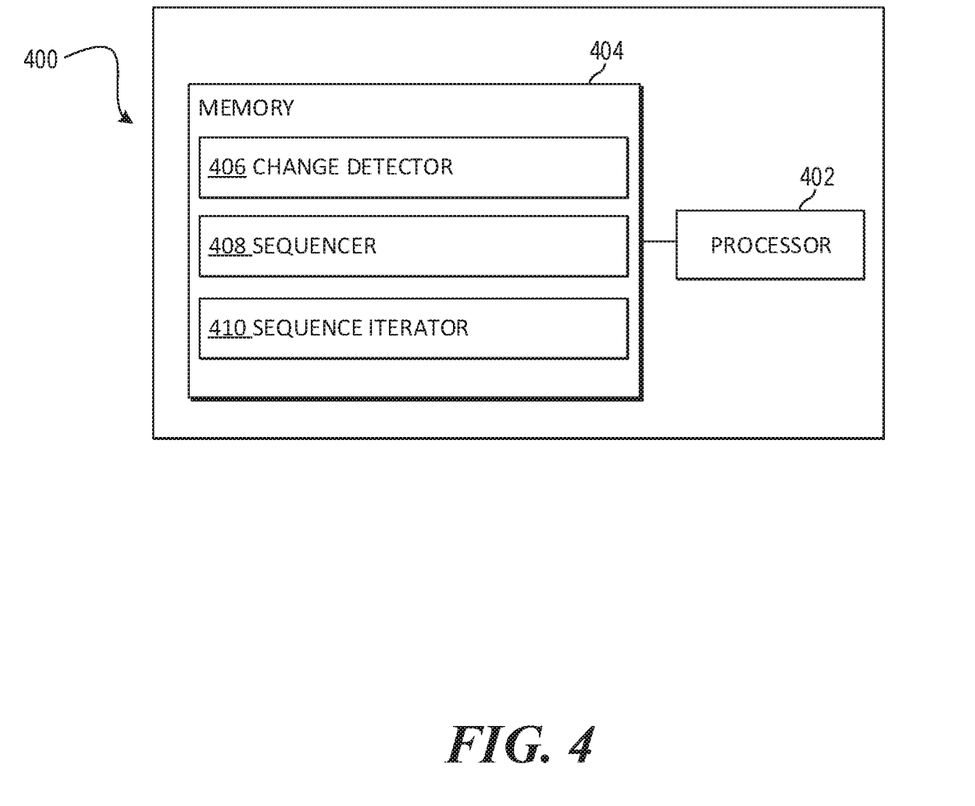
FIG. 4 is a block diagram of another example system for switch configuration troubleshooting.

FIG. 4 is a block diagram of an example system 400 for switch event ordering. In the example illustrated in FIG. 5. System 400 may be similar to system 100 described above in reference to FIG. 1. System 400 may include a processor 402 and a memory 404 that may be coupled to each other through a communication link (e.g., a bus). Processor 402 may include a single or multiple Central Processing Units (CPU) or another suitable hardware processor(s). In some examples, memory 404 stores machine readable instructions executed by processor 402 for system 400. Memory 404 may include any suitable combination of volatile and/or non-volatile memory, such as combinations of Random Access Memory (RAM), Read-Only Memory (ROM), flash memory, and/or other suitable memory.

Memory 404 stores instructions to be executed by processor 402 including instructions for change detector 406, sequencer 408, sequence iterator 410 and/or other components. According to various implementations, system 400 may be implemented in hardware and/or a combination of hardware and programming that configures hardware.

Processor 402 may execute change detector 406 to detect a plurality of changes in a database, wherein the database is used to configure a switch operating traffic on a network. Processor 402 may execute sequencer 408 to determine that a subset of the plurality of changes are to be deferred before being used to configure the switch. Each change in the subset may have a potential dependency with at least one other change in the subset. Processor 402 may execute a sequence iterator 410 to iterate through each change in the subset, including: confirming that a target change has a dependency with another change in the subset; resolving the dependency and transmitting the target change to an object manager for configuration of the switch.

Figure 5:
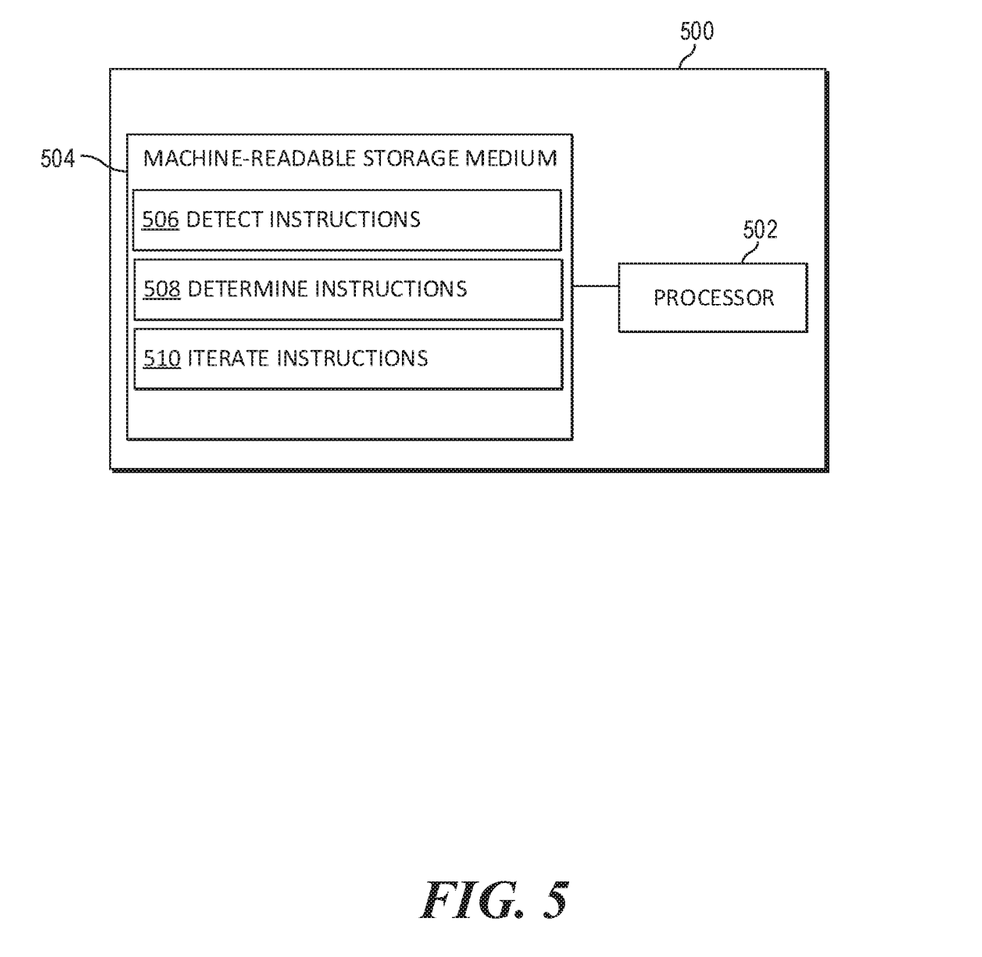
FIG. 5 is a block diagram of another example system for switch configuration troubleshooting.

FIG. 5 is a block diagram of an example system 500 for switch event ordering. In the example illustrated in FIG. 5, system 500 includes a processor 502 and a machine-readable storage medium 504. In some aspects, processor 502 and machine-readable storage medium 504 may be part of an Application-specific integrated circuit (ASIC). Although the following descriptions refer to a single processor and a single machine-readable storage medium, the descriptions may also apply to a system with multiple processors and multiple machine-readable storage mediums. In such examples, the instructions may be distributed (e.g., stored) across multiple machine-readable storage mediums and the instructions may be distributed (e.g., executed by) across multiple processors.

Processor 502 may be at least one central processing unit (CPU), microprocessor, and/or other hardware devices suitable for retrieval and execution of instructions stored in machine-readable storage medium 504. In the example illustrated in FIG. 5, processor 502 may fetch, decode, and execute instructions 506, 508 and 510 for switch event ordering. Processor 502 may include at least one electronic circuit comprising a number of electronic components for performing the functionality of at least one of the instructions in machine-readable storage medium 504. With respect to the executable instruction representations (e.g., boxes) described and shown herein, it should be understood that part or all of the executable instructions and/or electronic circuits included within one box may be included in a different box shown in the figures or in a different box not shown.

Machine-readable storage medium 504 may be any electronic, magnetic, optical, or other physical storage device that stores executable instructions. Thus, machine-readable storage medium 504 may be, for example, Random Access Memory (RAM), an Electrically-Erasable Programmable Read-Only Memory (EEPROM), a storage drive, an optical disc, and the like. Machine-readable storage medium 504 may be disposed within system 500, as shown in FIG. 5. In this situation, the executable instructions may be "installed" on the system 500. Machine-readable storage medium 504 may be a portable, external or remote storage medium, for example, that allows system 500 to download the instructions from the portable/external/remote storage medium. In this situation, the executable instructions may be part of an "installation package". As described herein, machine-readable storage medium 504 may be encoded with executable instructions for context aware data backup. The machine-readable storage medium may be non-transitory.

Referring to FIG. 5, detect instructions 506, when executed by a processor (e.g., 502), may cause system 500 to detect a plurality of changes in a database, wherein the database is used to configure a switch operating traffic on a network. Determine instructions 508, when executed by a processor (e.g., 502), may cause system 500 determine that a subset of the plurality of changes are to be deferred before being used to configure the switch. Each change in the subset may have a potential dependency with at least one other change in the subset. Iterate instructions 510, when executed by a processor (e.g., 502), may cause system 500 to iterate through each change in the subset, wherein the iteration includes confirming that a target change has a dependency with another change in the subset, resolving the dependency and transmitting the target change to an object manager for configuration of the switch.

The foregoing disclosure describes a number of examples for switch event ordering. The disclosed examples may include systems, devices, computer-readable storage media, and methods for switch event ordering. For purposes of explanation, certain examples are described with reference to the components illustrated in FIGS. 1-5. The content type of the illustrated components may overlap, however, and may be present in a fewer or greater number of elements and components. Further, all or part of the content type of illustrated elements may co-exist or be distributed among several geographically dispersed locations. Further, the disclosed examples may be implemented in various environments and are not limited to the illustrated examples.

Further, the sequence of operations described in connection with FIGS. 1-5 are examples and are not intended to be limiting. Additional or fewer operations or combinations of operations may be used or may vary without departing from the scope of the disclosed examples. Furthermore, implementations consistent with the disclosed examples need not perform the sequence of operations in any particular order. Thus, the present disclosure merely sets forth possible examples of implementations, and many variations and modifications may be made to the described examples.

The invention claimed is:

1. A method comprising:
   detecting a plurality of changes in a database, wherein the database is used to configure a switch operating traffic on a network;
   determining that a subset of the plurality of changes are to be deferred before being used to configure the switch, wherein each change in the subset has a potential dependency with at least one other change in the subset;
   iterating through each change in the subset, wherein the iteration includes:
      confirming that a target change has a dependency with another change in the subset;
      resolving the dependency and:
      transmitting the target change to an object manager for configuration of the switch.

2. The method of claim 1 comprising:
   converting each change in the plurality of changes into a data structure that can be used to configure the switch.

3. The method of claim 1 comprising:
   transferring, each change in the subset into a deferred queue.

4. The method of claim 1 comprising:
   transmitting each change in the plurality of changes that is not to be deferred to the object manager for configuration of the switch.

5. The method of claim 1 comprising:
   determining that a subset of the plurality of changes are to be deferred without knowing each potential dependency in the plurality of changes.

6. The method of claim 1 comprising:
   iterating through each change in the subset with knowledge of each potential dependency in the plurality of changes.

7. The method of claim 1 comprising:
   identifying if there are any deadlocks in the subset; and
   resolving the deadlocks after each other change in the subset has been resolved.

8. The method of claim 1 wherein each change in the subset of the plurality of changes is to be deferred because of an action associated with that change.

9. The method of claim 1 wherein the plurality of changes occur during a temporal period, the method comprising:
   creating a snapshot of the database at the end of the temporal period;
   determining the potential dependency based on the snapshot of the database;
   and confirming the dependency based on the snapshot of the database.

10. A system comprising:
    a processor; and
    a memory, the memory including instructions that when executed by the processor causes the processor to:
    detect a plurality of changes in a database, wherein the database is used to configure a switch operating traffic on a network;
    determine that a subset of the plurality of changes are to be deferred before being used to configure the switch, wherein each change in the subset has a potential dependency with at least one other change in the subset;
    iterate through each change in the subset, including:
       confirming that a target change has a dependency with another change in the subset;
       resolving the dependency and:
       transmitting the target change to an object manager for configuration of the switch.

11. The system of claim 10, further comprising the processor to: convert each change in the plurality of changes into a data structure that can be used to configure the switch.

12. The system of claim 10 further comprising the processor to transfer each change in the subset into a deferred queue.

13. The system of claim 10 further comprising the processor to transmit each change in the plurality of changes that is not to be deferred to the object manager for configuration of the switch.

14. The system of claim 10 further comprising the processor to:
    determine that a subset of the plurality of changes are to be deferred without knowing each potential dependency in the plurality of changes.

15. A non-transitory machine-readable storage medium encoded with instructions, the instructions executable by a processor of a system to cause the system to:
    detect a plurality of changes in a database, wherein the database is used to configure a switch operating traffic on a network;
    determine that a subset of the plurality of changes are to be deferred before being used to configure the switch, wherein each change in the subset has a potential dependency with at least one other change in the subset;
    iterate through each change in the subset, wherein the iteration includes:
       confirming that a target change has a dependency with another change in the subset;
       resolving the dependency and:
       transmitting the target change to an object manager for configuration of the switch.

16. The non-transitory machine-readable storage medium of claim 15, the instructions executable by a processor of a system to cause the system to:
    iterate through each change in the subset with knowledge of each potential dependency in the plurality of changes.

17. The non-transitory machine-readable storage medium of claim 15, the instructions executable by a processor of a system to cause the system to:
    identify if there are any deadlocks in the subset; and
    resolve the deadlocks after each other change in the subset has been resolved.

18. The non-transitory machine-readable storage medium of claim 15, wherein each change in the subset of the plurality of changes is to be deferred because of an action associated with that change.

19. The non-transitory machine-readable storage medium of claim 15, the instructions executable by a processor of a system to cause the system to:
    create a snapshot of the database at the end of the temporal period;
    determine the potential dependency based on the snapshot of the database; and confirm the dependency based on the snapshot of the database.

\* \* \* \* \*